July 31, 1956 D. E. THOMAS 2,757,243

TRANSISTOR CIRCUITS

Filed Sept. 17, 1951 2 Sheets-Sheet 1

INVENTOR
D. E. THOMAS
BY H. A. Burgess
ATTORNEY

July 31, 1956 D. E. THOMAS 2,757,243

TRANSISTOR CIRCUITS

Filed Sept. 17, 1951 2 Sheets-Sheet 2

INVENTOR
D. E. THOMAS

BY

ATTORNEY

United States Patent Office 2,757,243

Patented July 31, 1956

2,757,243

TRANSISTOR CIRCUITS

Donald E. Thomas, Madison, N. J., assignor to Bell Telephone Laboratories, Incorporated, New York, N. Y., a corporation of New York Application September 17, 1951, Serial No. 246,984

3 Claims. (Cl. 179—171)

This invention relates generally to transistor circuits and more particularly, although in its broader aspects not exclusively, to such transistor circuits as amplifiers and oscillators.

The principal object of the invention is to initiate the flow of emitter current in low voltage, low power, single-battery transistor circuits without affecting the operation of such circuits under steady-state conditions adversely.

Another object is to permit class AB, B, or C operation of self-biased transistor oscillators.

A further object of the invention is to provide simple automatic volume control in transistor oscillators.

Still another object is to reduce collector current variations in transistor circuits caused by such factors as voltage changes in the direct-current power supply, transistor aging, and changes of transistor units.

For many purposes, it is desirable to operate such transistor circuits as amplifiers and oscillators from single direct-current power supplies. In some instances, the objective may be to conserve space; in others, to enable the voltage source to be located at a place remote from the circuit. However, irrespective of the specific purpose, many transistor circuits may not be "self-starting" when operated from a single source of direct potential. In many circuits of this type, the emitter current which flows prior to the application of a suitable emitter bias is insufficient to assure the initial minimum transistor gain necessary to start circuit operation. One self-biasing arrangement for single-battery transistor circuits is shown in United States Patent 2,517,960, issued August 8, 1950, to H. L. Barney and R. C. Mathes. In that arrangement, use is made of the direct current flowing through the internal transistor base resistance and an added bypassed series base resistance to furnish a voltage of the proper polarity to bias the emitter in the forward direction and start the flow of emitter current.

In one of its principal aspects, the present invention takes the form of a self-biasing arrangement for low voltage, low power transistor circuits which has significant advantages over the prior art exemplified by the cited patent. One of the objectives thus far in transistor design has been to secure a collector current that is as low as possible for zero emitter current. It is, therefore, often necessary to provide a bleeder resistor between the direct-current power supply and the transistor base in order to secure enough current through the base resistor to produce a biasing potential sufficient to initiate the flow of sufficient emitter current to provide the gain needed to start circuit operation. However, if the base resistance is made small enough to avoid an undue loss of available direct collector potential under steady-state operating conditions, the bleeder current required is so high as to take too large a portion of the maximum permissible battery drain. On the other hand, if the bleeder current is held within reasonable bounds, the base resistance required is so high that under steady-state conditions, direct-current stability problems are introduced, the variation in transistor collector current with the normal spread of transistor parameters is magnified by the resulting direct-current positive feedback, and the available direct collector potential is reduced to a point where conversion efficiency suffers. In one of its major aspects, the present invention comprises a transistor circuit in which a resistance element having a negatively sloped resistance versus current characteristic is connected in the base lead. This variable resistor may be bypassed at signal frequencies.

The variable base resistor featured by the present invention permits a maximum initial emitter bias to be applied and yet does not use up too great a portion of the available direct-collector potential under steady-state operating conditions. Furthermore, since its resistance drops when the base current reaches its steady-state value, the direct-current stability problem is alleviated. In a number of embodiments of the invention, the variable resistor is preferably of the type across which the direct voltage drop rises only very slowly with increases in current, thus practically eliminating magnification of normal collector current variations by direct-current positive base feedback.

In many embodiments of the invention, the variable base resistor takes the form of a voltage-sensitive (as distinguished from temperature-sensitive) resistance device of the rectifier type. Crystal and copper-oxide rectifiers are common examples of this type of variable resistor. In such embodiments, the asymmetrically-conducting variable resistor in the base lead of the transistor is poled in the direction of normal collector current flow. When a bleeder resistor is used, it is connected so that the direct-current source biases the variable resistor in the direction of easy flow, i. e., the forward direction. In other embodiments, bilaterally-conducting resistance elements such as negative temperature coefficient thermistors or other devices having negatively sloped resistance-current characteristics may be used. Although a thermistor responds only to the heating effect of the current passing through it, rather than to its instantaneous value, as the above-mentioned voltage-sensitive type of resistance element does, it may be used to advantage in many embodiments of the invention. In certain embodiments, the fact that many varieties of negative temperature coefficient thermistors have regions in their operating characteristics in which the voltage drop decreases with further current increases may be used to reduce the effects of the inherent transistor base resistance. In this manner, collector current variations caused by such factors as changes in the supply voltage, transistor aging, and changes of transistor units may actually be reduced.

In a number of oscillator embodiments, the invention is further featured by a bypassed resistor connected in series in the positive feedback path between the transistor collector and emitter. Such an arrangement gives a bias under steady-state operating conditions that opposes the initial starting bias provided by the variable resistor in the base lead and can be used to give operation analogous to class AB, B, or C operation in vacuum tube oscillators. In addition, automatic volume control is provided by the action of the additional resistor in varying the collector current operating angle in the direction to restore the amplitude of the collector current to its normal steady-state value whenever it departs therefrom.

A more complete understanding of the invention may be obtained from a study of the following description of a number of specific embodiments. In the drawings.

Figure 2:
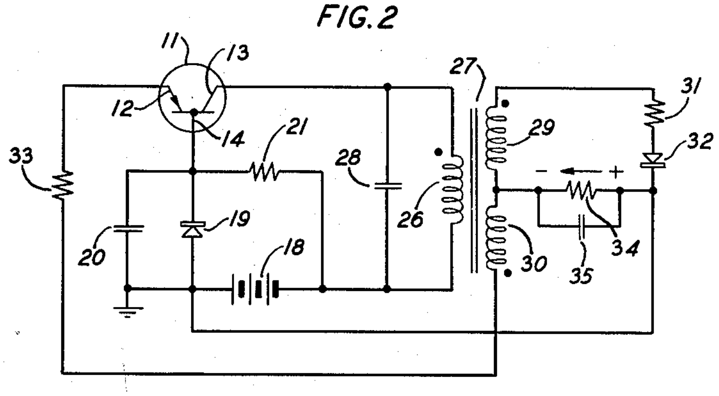
Fig. 2 is a schematic diagram of a Class C transistor oscillator embodying the invention and having a rectifying load.
Figure 3:
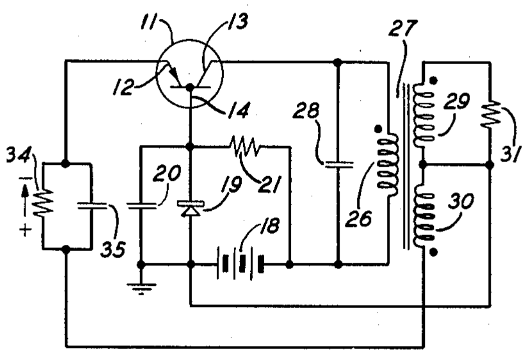
Figure 4:
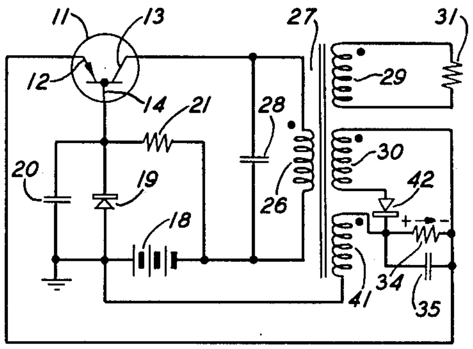
Figure 5:
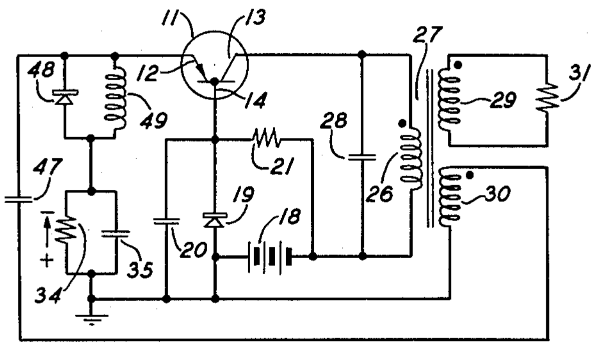
Figure 6A:
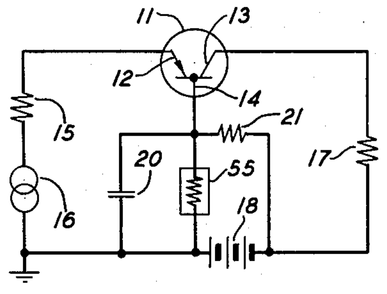
Figure 6B:
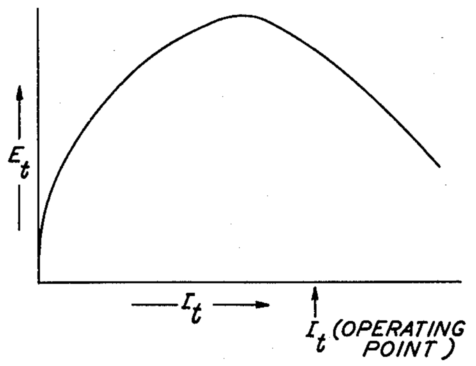

Figs. 3, 4, and 5 are schematic diagrams of variations of the oscillator shown in Fig. 2 having non-rectifying loads;

Fig. 6A illustrates a transistor amplifier embodying the invention and having a bypassed negative temperature coefficient thermistor in the transistor base lead; and Fig. 6B shows the voltage versus current characteristic of the thermistor used in the circuit of Fig. 6A.

Figure 1A:
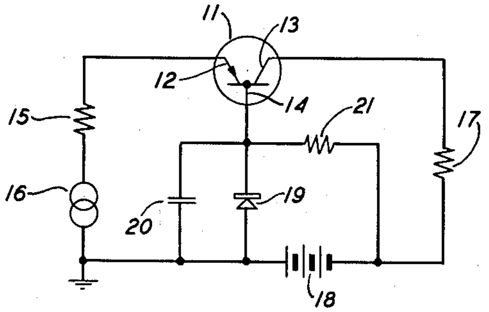
Fig. 1A is a schematic diagram of a transistor amplifier embodying the present invention.

In Fig. 1A, the transistor 11 possesses an emitter electrode 12, a collector electrode 13, and a base electrode 14. In the conventional symbol, the emitter is indicated by the arrow, and the direction of normal emitter current flow is indicated by the direction of the arrow. Thus, since its emitter current normally flows into the body from the emitter, the common point-contact type of transistor having a body of n-type semiconductive material (described in the article, "Some circuit aspects of the transistor," by R. M. Ryder and R. J. Kircher, appearing on page 367 of the July 1949 issue of the Bell System Technical Journal) is represented by a symbol in which the emitter arrow points toward the base. On the other hand, since its emitter current normally flows away from the body into the emitter electrode, the recently developed n-p-n type of transistor (described in the article, "Some circuit properties and applications of n-p-n transistors," by R. L. Wallace, Jr., and W. J. Pietenpol, appearing on page 530 of the July 1951 issue of the Bell System Technical Journal) is represented by a symbol in which the emitter arrow points away from the base. For convenience in this and succeeding figures, the conventional transistor symbol has the emitter arrow pointing toward the base, and all battery and rectifier polarities are chosen for the indicated direction of emitter current flow. The illustrated embodiments of the invention are, however, not limited to any particular type of transistor. For emitter current flow in the opposite direction, battery and rectifier polarities are reversed from those shown in the drawings.

The emitter of transistor 11 in Fig. 1A is connected to a feed resistor 15, and a suitable signal source 16 is connected between that resistor and ground. A load resistor 17 is connected between the collector and the negative side of a direct-current power supply 18, the positive side of which is grounded. Power supply 18 serves to bias the collector in the reverse direction. In the prior art, as exemplified by the above-noted patent, such an amplifier circuit was made self-biasing by the inclusion of a bypassed resistor between the base of the transistor and ground. If the collector current in the absence of emitter current was large enough, the base electrode was forced negative with respect to ground, with the result that, with respect to the base, a net positive potential was applied to the emitter, biasing it in the forward direction. Starting emitter current would then begin to flow, and the circuit would become operative. However, while such an arrangement is satisfactory for many purposes, it does suffer the disadvantages in low voltage, low power installations which have been set forth above. High collector current for zero emitter current is generally considered an undesirable transistor characteristic; and if the base resistor is large enough to provide the desired potential drop with low collector current, under steady-state conditions direct-current stability problems arise, and normal collector current variations are unduly magnified by direct-current positive base feedback. If the collector current for zero emitter current is, as is generally desired, too low to furnish the necessary starting potential drop by itself, a bleeder resistor is usually employed. However, even then, if the base resistor is small the bleeder current required is so large as to take up too large a portion of the maximum permissible power supply drain. If the base resistance is high enough not to require unreasonable bleeder currents, the steady-state problems of direct-current instability and magnification of collector current variations arise. In addition, the available direct potential is reduced to a point where conversion efficiency, i. e., the ratio of alternating-current power output to direct-current power input, suffers.

In accordance with a feature of the present invention, the transistor amplifier shown schematically in Fig. 1A is provided with a base resistor 19, the direct-current resistance versus current characteristic of which has a negative slope. In other words, the resistance of element 19 decreases as the current passing through it increases. Element 19 is preferably a voltage-sensitive resistance element of the type commonly known as a varistor. Most devices of this type, such as copper-oxide or crystal rectifiers, are asymmetrically-conducting devices and, when used in the instant circuit, are poled in the direction of normal collector current flow. A bypass condenser 20 is shunted around element 19, and a bleeder resistor 21 is connected between the base electrode of transistor 11 and the negative pole of direct-current source 18.

Figure 1B:
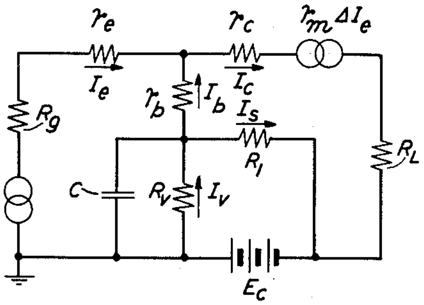
Fig. 1B is a direct-current static equivalent circuit of the amplifier shown in Fig. 1A.

A direct-current static equivalent circuit of the embodiment of the invention shown in Fig. 1A appears in Fig. 1B. There, transistor 11 is represented by the conventional T-network comprising the direct-current internal emitter, collector, and base resistances $r_e$, $r_c$, and $r_b$, along with the equivalent generator $r_m \Delta I_e$. In this last representation, $r_m$ is the so-called mutual resistance of the transistor and $\Delta I_e$ represents momentary change in the direct emitter current. Feed resistor 15 is represented in Fig. 1B by $R_g$, load resistor 17 by $R_L$, variable resistor 19 by $R_v$, and bleeder resistor 21 by $R_l$. In addition, C is the capacity of bypass condenser 20, $E_c$ is the voltage supplied by direct-current power supply 18, $I_c$ is the direct collector current, $I_b$ is the direct base current, and $I_s$ is the direct bleeder or starting current flowing through $R_l$. $E_v$ is the direct voltage drop across $R_v$, while $I_v$ is the direct current flowing through it.

Figure 1C:
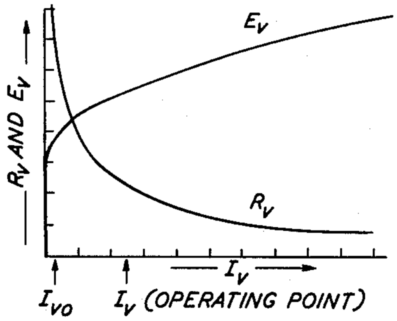
Fig. 1C illustrates the resistance versus current and voltage versus current characteristics of the variable resistor used in the transistor base lead of the amplifier shown in Fig. 1A.

The characteristics of a preferred type of voltage-sensitive resistance element for use as element 19 are illustrated graphically in Fig. 1C. The lower curve represents the variation of $R_v$ with $I_v$, while the upper represents the variation of $E_v$ with the same quantity. These curves, it will be noted, are characteristic of most voltage-sensitive (as distinguished from temperature-sensitive) resistance elements. Copper-oxide and crystal rectifiers in particular have such characteristics.

The presence of element 19 in the base circuit of transistor 11 in Fig. 1A renders the amplifier self-starting. As direct-current source 18 is inserted in the circuit, the direct collector current for zero emitter current, $I_{c0}$, begins to flow. Since, in a good transistor, $I_{c0}$ is low, a relatively large bleeder resistor 19 is provided. Bleeder resistor 19 passes a small substantially constant direct current, $I_s$, which flows in the same direction as $I_{c0}$ and combines with a portion of it to form the initial direct current through element 19, $I_{v0}$. As indicated in Fig. 1C, this initial current $I_{v0}$ gives variable resistor 19 a relatively high resistance, and the direct voltage drop across it provides a sufficient bias to initiate the flow of starting direct emitter current in transistor 11. As the direct emitter current begins to flow, the direct collector current increases, causing the direct current flowing in element 19 to increase. As this latter current increases, the resistance of variable resistor 19 drops until the collector current reaches a stable value determined by the transistor characteristics. The current $I_v$ then reaches a stable value, as indicated in Fig. 1C, and the resistance of element 19 reaches a constant low value. The direct voltage drop $E_v$ across it remains relatively constant, providing a substantially fixed forward bias for the emitter of transistor 11.

The problems encountered in the prior art are, for all practical purposes, non-existent in the embodiment of the invention shown in Fig. 1A. The negatively sloped direct-current resistance versus current characteristic of variable resistor 19 matches the corresponding characteristic of the transistor emitter itself and provides the right type of base resistance characteristic to permit maximum emitter current to flow under starting conditions and yet not use up too great a portion of the variable direct collector potential under steady-state operating conditions. Furthermore, since the resistance of element 19 drops when the base current reaches its steady-state value, the direct-current stability problem is greatly reduced. Finally, since the voltage drop $E_v$ rises only very slowly with increases in current, the magnification of normal collector current variations due to direct-current positive base feedback is practically eliminated.

It will be noted that the bleeder current provided by resistor 21 merely supplements $I_{co}$ in providing the initial direct current through variable resistor 19. In transistor circuits in which $I_{co}$ is high, this current itself, when divided between the emitter and base circuits in inverse proportion to their direct-current resistances, may provide enough emitter bias to initiate operation. However, a high value of $I_{co}$ is generally an undesirable transistor characteristic. When it is low, use of the bleeder resistor 21 is usually necessary.

The operation of variable resistor 19 in the circuit shown in Fig. 1A is to be distinguished from the operation of thermistors in such circuits as bridge-stabilized oscillators. In such circuits, the heating effect of the alternating-current oscillations as they build up serves to vary the resistance of the thermistor in the direction to limit the amplitude of the oscillations. The operation of variable resistor 19, however, is entirely different. It is essentially a direct-current phenomenon, as opposed to the alternating-current operation of the bridge-stabilized oscillator. The presence of variable resistor 19 in the circuit of Fig. 1A permits the initiation of the starting emitter current. As the direct emitter current increases with the accompanying increase in collector current, the resistance of element 19 drops to its steady-state value, avoiding a number of undesirable direct-current effects. The amplitude of the steady-state emitter current is limited by the transistor characteristics rather than by any action of variable resistor 19.

The relationships between the various direct currents flowing under a given set of steady-state conditions in the embodiment of the invention shown in Fig. 1A may be demonstrated by straightforward analysis of the direct-current static equivalent circuit forming Fig. 1B. All resistances and currents are direct-current values for a given set of stable steady-state conditions. In the first place, $$I_v=I_b+I_s=I_s+I_c-I_e \quad (1)$$

Secondly, $$I_e(R_g+r_e)=R_v(I_s+I_c-I_e)+r_b(I_c-I_e) \quad (2)$$

From Equation 2, the direct emitter current is found to be $$I_e=\frac{R_v(I_s+I_c)+r_bI_c}{R_v+R_s+r_e+r_b} \quad (3)$$

Since $R_v$ appears in both the numerator and the denominator of expression in 3, it is not immediately apparent how $I_e$ varies with $R_v$. However, in determining the slope of the curve of $I_e$ versus $R_v$ with all other terms constant by differentiating $I_e$ with respect to $R_v$, the following relation is found:

$$\frac{dI_e}{dR_v}=\frac{(R_g+r_e+r_b)I_s+(R_g+r_e)I_c}{(R_v+R_g+r_e+r_b)^2} \quad (4)$$

This slope is positive for all positive values of $R_v$, which means that for all positive values of $R_v$, $I_e$ increases with increases in $R_v$. Thus, the larger the initial value of $R_v$, the larger is the initial value of $I_e$ for a given value of $I_s$ and $I_{co}$. In fact, the larger $R_v$ is, the more closely while $I_e$ approach its maximum value of $I_s+I_c$. A principal feature of the present invention permits this maximum value to be approached under starting conditions without adversely affecting direct-current steady-state performance.

Another embodiment of the invention is shown schematically in Fig. 2. The circuit shown is a transistor oscillator, the class of operation of which is analogous to Class C operation in a vacuum tube oscillator. The self-biasing arrangement is the same as in Fig. 1A, and the primary winding 26 of transformer 27 is connected between the collector electrode of transistor 11 and the negative side of direct-current source 18. A condenser 28 shunts winding 26 and tunes it to the desired oscillation frequency. Transformer 27 is provided with two secondary windings 29 and 30, the relative polarities of which, with respect to winding 26, are indicated in the conventional manner by dots. The particular load used in connection with the circuit shown in Fig. 2 is a rectifying load, is represented by a resistor 31 in series with a rectifier 32, and is connected between one side of winding 29 and ground with the rectifier 32 poled in the indicated direction. Winding 30 is connected in series between the other side of winding 29 and one side of a small resistor 33, the other side of which is coupled directly to the emitter of transistor 11. In accordance with a feature of the invention, a resistor 34, bypassed by a condenser 35, is connected between ground and the junction between windings 29 and 30.

In the operation of the embodiment of the invention shown in Fig. 2, the emitter power necessary to maintain oscillation is provided by transformer coupling from the collector to the emitter of transistor 11. The collector or primary winding 26 of transformer 27 is designed for maximum Q, is tuned by condenser 28 to the desired operation frequency, and in conjunction with condenser 28 serves to suppress harmonics of the fundamental frequency. The flow of emitter current is initiated by the action of variable resistor 19 in the same manner as in the embodiment of the invention shown in Fig. 1A.

Under steady-state operating conditions, even though the bias resulting from the necessity of introducing resistance into the base circuit to make oscillations self-starting is reduced to a minimum by the use of variable resistor 19, it still results in a net positive bias on the emitter electrode. In order to get collector current conduction over less than half the total operating cycle and thereby obtain the equivalent of Class C operation with its resultant increase in conversion efficiency, it is necessary that the net emitter bias be negative, in order to bias transistor 11 beyond cut-off. Furthermore, some self-adjustment feature is desirable to assure that variations in output voltage of the oscillator with transistors having a reasonable range of operating parameters will not be too great. In accordance with a feature of the present invention, the load rectification, in conjunction with the rectification in the emitter circuit resulting from Class C operation, is used to provide both automatic volume control and a net negative emitter bias. This is accomplished by the introduction of bypassed resistor 34 into the common load and emitter circuit. Since the rectified load and emitter currents flow through resistor 34 in the direction to bias the emitter negatively, the necessary negative bias is provided to obtain Class C operation. Also, since both of these currents increase with increased output, the negative emitter bias, and hence the operating angle of the oscillator, are under the control of the output in such a way as to provide automatic volume control. The result is to reduce the effect of transistor parameter variation on output voltage. This automatic volume control is aided by resistor 33 in the emitter circuit, the principal purpose of which is to reduce the percentage variation of emitter circuit resistance due to transistor variations and to add to the direct-current stability of the circuit.

By way of example, the following circuit parameters may be used in the embodiment of the invention shown in Fig. 2:

| | | |
|---|---|---|
| Direct-current source **18** | volts | 6 |
| Bleeder resistor **21** | ohms | 12,000 |
| Condenser **28** | microfarads | 17.3 |
| Resistor **33** | ohms | 100 |
| Resistor **34** | do | 250 |
| Condenser **35** | microfarads | 500 |

An oscillator constructed with these circuit elements gave a nine-milliwatt output into an 11,000 ohm load at a frequency of about 80 cycles, with a maximum battery drain of 30 milliwatts. Variable resistor 19 was of the copper-oxide rectifier type, and the turns ratio of transformer 27 was 1:2.8:9.6 for windings 30, 26, and 29, respectively. The self-inductance of winding 26 was 238 millihenries, while the non-loaded Q of the same winding was 46 at 80 cycles. The circuit featured a good conversion efficiency at low battery supply voltage and low power output, single battery self-starting oscillation, and simple self-adjusting features to assure a minimum variation in output power into a fixed load for transistors having a reasonable spread in their operating parameters. The particular transistors used were of the point contact type with n-type semiconductive bodies.

The embodiment of the invention shown schematically in Fig. 3 is a variation of the Class C transistor oscillator shown in Fig. 2 having a non-rectifying load. The circuit connections are substantially the same except the junction between windings 29 and 30 is connected directly to ground, and resistor 34 and bypass condenser 35 are connected in parallel between the ungrounded side of winding 30 and the emitter of transistor 11. The operation of the circuit is substantially the same as described in connection with Fig. 2 except that only the rectification in the emitter circuit resulting from Class C operation is relied upon to provide the necessary direct voltage drop across resistor 34 for a negative emitter bias.

The embodiment of the invention illustrated in Fig. 4 is another variation of the Class C transistor oscillator shown in Fig. 2. Like that of Fig. 3, it, too, has a non-rectifying load. It differs from the circuit of Fig. 2 in that it features an additional secondary winding 41 for transformer 27 and a rectifier 42 connected in series with winding 30. Resistor 31, representing the non-rectifying load, is connected directly across winding 29. Winding 29 is, in this embodiment, not directly connected in any way to the rest of the oscillator, the only coupling being through transformer 27. The relative polarities of secondary windings 29, 30, and 41 with respect to primary winding 26 are, as before, indicated by dots.

Feedback to sustain oscillations in the embodiment of the invention shown in Fig. 4 is provided from winding 41. One side of winding 41 is grounded, while the other is connected through the parallel combination of resistor 34 and condenser 35 to the emitter of transistor 11. The emitter is also connected directly to the side of winding 30 corresponding to the ungrounded side of winding 41, while the other side of winding 30 is connected through rectifier 42 to the ungrounded side of winding 41. Rectifier 42 is poled for easy current flow in the direction from winding 30 to resistor 34.

The oscillator shown in Fig. 4 operates in much the same manner as does that described in connection with Fig. 2. Variable resistor 19 provides self-starting operation in the manner which has been described, and bypassed resistor 34 provides both a negative emitter bias for Class C operation and automatic volume control. Rectifier 42 provides a unidirectional current through resistor 34 from winding 30 which is proportional to the alternating-current output and which furnishes a negative emitter bias proportional to that output. Automatic volume control is provided by the action of the emitter bias in narrowing the operating angle as alternating-current output increases and widening the operating angle if that output decreases.

Still another Class C transistor oscillator embodying features of the present invention is the variation of the circuit of Fig. 2 shown in Fig. 5. There, the load is non-rectifying and, as in Fig. 4, there is no direct connection between load winding 29 and the rest of the oscillator. One side of winding 30 is grounded, and the other is connected through a coupling condenser 47 to the emitter electrode of transistor 11. Resistor 34 and its shunting condenser 35 are connected between ground and one side of the parallel combination of an additional rectifier 48 and a choke coil 49. The other side of the last-mentioned combination is connected directly to the emitter, rectifier 48 being poled for easy current flow towards the emitter.

The circuit illustrated in Fig. 5 also operates in substantially the same manner as does that of Fig. 2. Emitter current is started by the action of variable resistor 19 in providing an initial positive emitter bias. As oscillations build up to a steady-state value determined by the voltage supplied by source 18, alternate half-cycles of the signal frequency currents in winding 30 are rectified by rectifier 48 and the emitter of transistor 11, and the resulting direct voltage drop across resistor 34 provides a steady-state negative emitter bias, giving Class C operation. As with the other oscillator embodiments of the invention, bypassed resistor 34 also provides automatic volume control by narrowing the operating angle whenever the alternating-current output exceeds its steady-state value and widening the operating angle whenever the alternating-current output falls below that point.

Still another embodiment of the invention is shown in Fig. 6A. The amplifier depicted there schematically is the same as that of Fig. 1A except that a self-heated thermistor 55 having a negative temperature coefficient of resistance replaces element 19. As is element 19 in Fig. 1A, thermistor 55 is bypassed for signal frequencies by condenser 20.

A typical voltage versus current characteristic for a thermistor having a negative temperature coefficient of resistance is shown in Fig. 6B, where $I_t$ represents the base current flowing through thermistor 55 and $E_t$ represents the direct voltage drop across that element. $E_t$ increases with increasing $I_t$ initially, but the rate of increase decreases until a peak point is reached. From that point on, $E_t$ decreases with further increases in $I_t$. The direct-current resistance presented by thermistor 55 is always positive but decreases with increased $I_t$. For values of $I_t$ beyond the peak point, the thermistor 55 has a negative dynamic resistance, the voltage versus current characteristic having a negative slope. Using the notation explained in connection with Fig. 1B, in the amplifier shown in Fig. 6A $$I_t = I_b + I_s = I_s + (I_c - I_e) \qquad (5)$$

In the embodiment of the invention shown in Fig. 6A, $I_s$ and $(I_c - I_e)$ are so chosen that under steady-state operating conditions, $I_b$ is well into the negative dynamic resistance portion of the curve. For small changes in $I_t$ which are slow in comparison with the thermal time constant of thermistor 55, that element produces a negative feedback effect, as opposed to the positive feedback effect usually produced by a resistor in the base circuit of a transistor. If the collector current $I_c$ decreases due to a decrease in the voltage supplied by direct-current source 18, to aging effects in the transistor itself, or to an actual change of transistor units, the base current $I_b$ will decrease; but the voltage drop $E_t$ across thermistor 55 will increase. This will increase the emitter current $I_e$ and in turn cause an increase in $I_c$ which is in the direction to stabilize the circuit and reduce the net change in $I_c$. Conversely, if $I_c$ increases, $E_t$ will decrease, and $I_e$ will decrease and produce a decrease in $I_c$ to oppose the initial increase, thus tending to reduce the net change in $I_c$.

In accordance with the features of the invention embodied by the transistor amplifier shown in Fig. 6A, not only are starting problems solved, but also the amplifier direct-current operating point is stabilized. The flow of starting emitter current is initiated in the manner described in connection with Fig. 1A. The high initial resistance of thermistor 55 provides a sufficiently high positive bias on the emitter of transistor 11 to initiate that flow. As the direct current through thermistor 55 builds up, the thermistor resistance decreases until its steady-state value is reached. As has been explained in connection with Fig. 1A, steady-state problems of direct-current instability and reduction of conversion efficiency by the reduction of the available direct collector potential are alleviated. In addition, not only is magnification of collector current variations due to direct-current positive feedback reduced, it is actually eliminated. In fact, there is a negative feedback effect which tends to reduce collector current variations rather than magnify them. In a sense, the resistance of thermistor 55 may be said to have the effect of counteracting the inherent base resistance of transistor 11.

Finally, it should be noted once more that the operation, in accordance with the principles of the present invention, of variable resistor 19 in Figs. 1 through 5 and thermistor 55 in Fig. 6A is primarily a direct-current phenomenon. These elements control the direct currents flowing in their respective transistor circuits. Elements 19 and 55 are bypassed for signal frequencies and hence can have no effect on signal frequency currents other than the incidental effects which they exert through control of the direct-current operation of the respective transistors.

It is to be understood that the above-described arrangements are illustrative of the application of the principles of the invention. Numerous other arrangements may be devised by those skilled in the art without departing from the spirit and scope of the invention.

What is claimed is:

1. In combination, a transistor having an emitter electrode, a collector electrode, and a base electrode, a first circuit path interconnecting said emitter and base electrodes, a second circuit path interconnecting said collector and base electrodes, a source of direct potential connected in said second circuit path to bias said collector electrode in the reverse direction, and circuit means common to both of said circuit paths comprising a voltage-sensitive resistance element of the rectifier type connected between said base electrode and a common input-output terminal, poled in the direction of normal collector current flow, and having a resistance magnitude so related to the current common to both of said circuit paths flowing in the absence of emitter current as to provide not only a forward starting bias for said emitter electrode sufficient to initiate the flow of current therethrough but also a resistance common to both of said circuit paths which is reduced to a value at least several times less than its initial value after the direct current therethrough has reached its steady-state value.

2. In combination, a transistor having an emitter electrode, a collector electrode, and a base electrode, a first circuit path interconnecting said emitter and base electrodes, a second circuit path interconnecting said collector and base electrodes, a source of direct potential connected in said second circuit path to bias said collector electrode in the reverse direction, circuit means common to both of said circuit paths comprising a voltage-sensitive resistance element of the rectifier type connected between said base electrode and a common input-output terminal and poled in the direction of normal collector current flow to provide not only a forward starting bias for said emitter electrode sufficient to initiate the flow of current therethrough but also a resistance common to both of said circuit paths which is reduced to a value at least several times less than its initial value after the direct current therethrough has reached its steady state value, and a bleeder resistor connected between the side of said resistance element electrically nearest said base electrode and the side of said source electrically nearest said collector electrode to increase the amount of direct current flowing through said resistance element.

3. A combination in accordance with claim 2 which includes a bypass capacitor connected in parallel with said resistance element.

References Cited in the file of this patent

UNITED STATES PATENTS

| | | |
|---|---|---|
| 1,869,331 | Ballantine | July 26, 1932 |
| 2,313,096 | Shephard | Mar. 9, 1943 |
| 2,431,306 | Chatterjea et al. | Nov. 25, 1947 |
| 2,468,082 | Chatterjea et al. | Apr. 26, 1949 |
| 2,502,479 | Pearson et al. | Apr. 4, 1950 |
| 2,517,960 | Barney et al. | Aug. 8, 1950 |
| 2,544,211 | Barton | Mar. 6, 1951 |
| 2,548,901 | Moe | Apr. 17, 1951 |
| 2,556,286 | Meacham | June 12, 1951 |
| 2,556,296 | Rack | June 12, 1951 |
| 2,585,077 | Barney | Feb. 12, 1952 |
| 2,600,500 | Haynes et al. | June 17, 1952 |
| 2,662,122 | Ryder | Dec. 8, 1953 |

OTHER REFERENCES

Terman text, "Radio Engineering," pages 754–755, 3d ed.; pub. 1947 by McGraw-Hill Book Co., N. Y. C.